May 24, 1960   E. J. LIMPEL   2,937,408
METHOD TO INSULATE DYNAMOELECTRIC MACHINE
WINDINGS BY CENTRIFUGALLY CASTING
Filed June 1, 1954
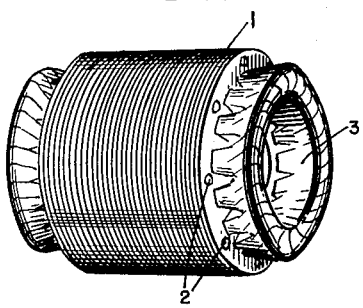
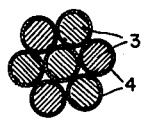
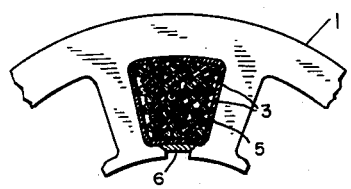
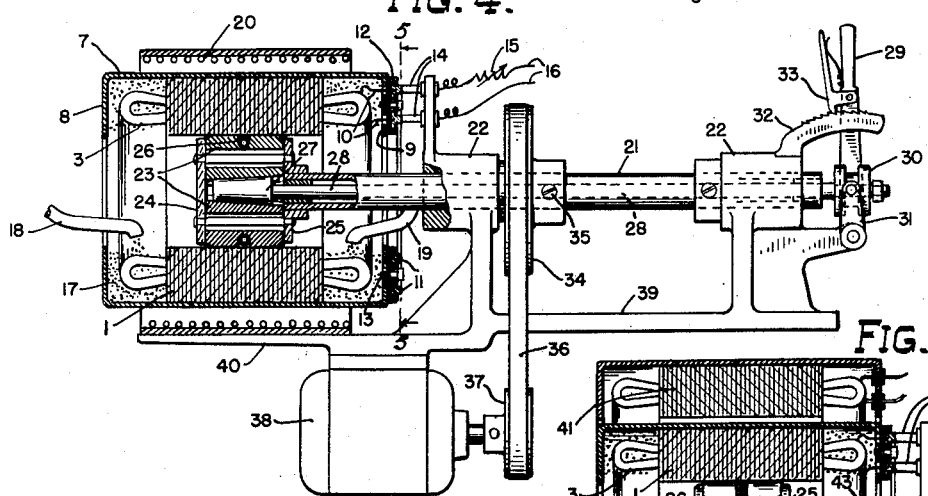
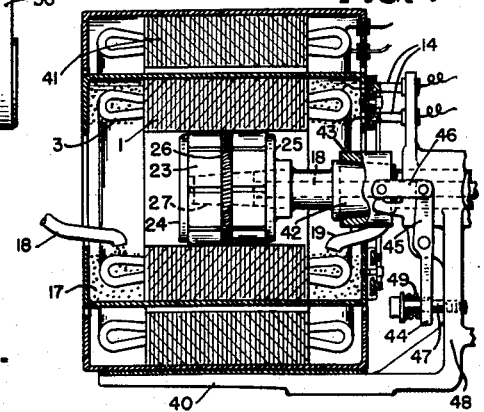
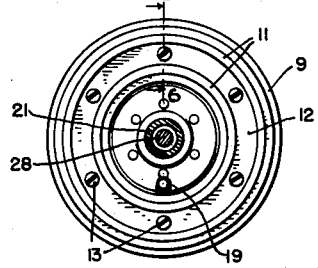
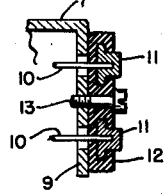
INVENTOR.
EUGENE J. LIMPEL
BY *Andrus + Seeales*
ATTORNEYS.

United States Patent Office 2,937,408
Patented May 24, 1960

2,937,408

METHOD TO INSULATE DYNAMOELECTRIC MACHINE WINDINGS BY CENTRIFUGALLY CASTING

Eugene J. Limpel, Milwaukee, Wis., assignor to A. O. Smith Corporation, Milwaukee, Wis., a corporation of New York Filed June 1, 1954, Ser. No. 433,679

6 Claims. (Cl. 18—58.3)

This invention relates to a method of insulating the windings of a dynamoelectric machine.

In dynamoelectric machines operating in damp surroundings or submersed in a liquid, the primary winding or field winding requires protection from the surrounding medium. Further, the heat generated in the winding must be dissipated to prevent a burnout of the winding.

Protection of the winding is normally accomplished by providing a sealed chamber about the winding and having a high heat transfer material within the chamber as the protecting medium for the winding, such as oil or a thermosetting plastic.

With plastic as the protecting medium, air bubbles and the like present in the plastic result in hot spots which cause a "burnout" of the winding. The formation of air bubbles between the winding conductors and immediately adjacent the winding is particularly damaging to the winding. In the past, to avoid the air bubbles and consequent hot spots, the insulation was generally applied by injection, or pressure molding. The injection molding requires careful work and often is not entirely satisfactory.

According to the present invention, the plastic insulation is centrifugally cast about the winding. The winding is employed to produce the heat for curing and setting the plastic.

More particularly, according to the present invention, the stator core and winding is first enclosed in a container. The container is filled with an uncured thermosetting plastic resin or wax which envelops the winding and core. While inserting the plastic resin, the assembly is rotated at a high speed to centrifugally cast the plastic and, at the same time, the winding is energized to generate heat for the thermosetting of the plastic. An induction heater may also be employed to heat the container and the confined plastic and thereby decrease the time required for curing and setting the plastic.

The invention therefor provides an improved method of forming a plastic protected winding and eliminating voids in the plastic.

The drawing furnished herewith illustrates the best mode presently contemplated for carrying out the invention.

In the drawing:

Figure 1 is a perspective view of a stator to be enclosed in plastic insulation;

Fig. 2 is an enlarged cross-sectional view of portion of a coil winding;

Fig. 3 is an enlarged view of a portion of the stator core showing one of the winding slots;

Fig. 4 is a view in section of the stator secured within a container for the centrifugal casting of the insulation;

Fig. 5 is a view taken on line 5—5 of Fig. 4 without the induction heater of Fig. 4;

Fig. 6 is a view taken on line 6—6 of Fig. 5; and

Fig. 7 is a view illustrating another method of centrifugal casting and thermosetting the insulation.

Referring to Figure 1, the conventional stator of a dynamoelectric machine is shown as comprising a magnetizable core 1 formed of a plurality of similar laminations and held together by a plurality of rivets 2. The core 1 is provided with a plurality of winding slots accommodating a winding 3 which protrudes from the ends of the core.

The winding 3 consists of a plurality of coils distributed about the core 1 in the conventional manner. As shown in Fig. 2, each coil consists of a number of turns of wire with an electrically insulating covering 4 to separate the wires.

To further insulate the winding 4 from the core 1, electrical insulation 5 lines the walls of each slot as shown in Fig. 3. A tapered insert bar 6 closes the slot and securely holds the winding within the slot.

According to the present invention, the assembled stator core 1 and winding 4 are secured to the interior surface of a cylindrical wall 7 by welding or brazing the outer surface of the core 1 to the wall 7. To provide a retaining chamber about the core and winding, a pair of annular end walls 8 and 9 are formed integrally with the wall 7, one to each end of the cylindrical wall 7.

As more clearly shown in Figs. 5 and 6, the winding leads 10 are connected to a pair of annular sliding contacts 11 which are embedded in an electrically insulating base 12 adjacent the end wall 9. The base 12 is secured to the end wall 9 such as by a plurality of bolts 13 threading into corresponding threaded openings in the end wall 9.

To energize the winding 4 when the stator core 1 rotates, as hereinafter described, a pair of stationary contacts 14 are connected to a suitable source of current, not shown, and secured in sliding engagement with the contacts 11. A variable resistor 15 in the leads 16 connecting the contacts 14 to a source of current, not shown, provides for the manual adjustment of the excitation of the winding 4.

An electrically insulating and high temperature thermosetting plastic resin 17 is forced into the chamber defined by the walls 7, 8 and 9 to provide an envelope about the winding 3 and the core 1. The resin 17, as initially inserted in the chamber, is an uncured thermosetting resinous material which upon setting forms a solid mass which protects the winding from the surrounding medium and serves as a carrier for dissipation of the heat generated in the windings under operating conditions. Epoxy and polyester resins are examples of suitable plastic resins having the required properties.

The resin 17 is inserted into the chamber about the core 1 and winding 3 by a pair of nozzles 18 and 19 each of which communicate with the chamber adjacent an opposite end of the core 1. The nozzles 18 and 19 are pressurized in any suitable manner, not shown, to inject the resin into the chamber.

To cure and set the resin 17, the winding 4 is energized from a suitable source of current, not shown, as previously described. Either A.C. or D.C. current is used. The winding 3 is heated by the current flow and heats the resin 17. The heat is generated in the center of the plastic and moves outwardly with a decrease in curing and setting time.

The curing and setting time is further reduced by heating the walls 7, 8 and 9. An induction heating coil 20 is secured about the wall 7 and the secondary currents set up in the container by the coil 20 generate heat which assists in the curing and setting of the resin 17.

While the plastic 17 is being cured and set, the core 1 is rotated at a speed sufficient to centrifugally cast the plastic and eliminate bubbles and other voids.

For purposes of illustration, the structure shown to rotate the core 1 comprises a hollow shaft 21 journaled in a pair of support bearings 22 and which extends axially into the core 1 and carries an expandable clamp.

The clamp comprises a plurality of radially moving shoes 23 slideably secured between a pair of axially spaced end plates 24 and 25 and biased to an innermost position by a garter spring 26. The garter spring 26 is positioned within a central recess in each shoe. The inner surface of each shoe is tapered such that a movable tapered pin 27 forces the shoes radially outwardly against the bias of the garter spring 26. The tapered pin 27 is secured to a rod 28 which extends through the hollow shaft 21 and is linked to a lever 29 through a collar 30 secured to the rod 28. The lever 29 is linked to the collar by a yoke 31 to provide axial movement of the rod 28 and pin 27. A curved ratchet 32 extends from the outermost bearing 22 into cooperating relation with a pawl 33 secured to the lever 29 to hold the lever 29 in various positions.

To transmit a rotary motion to the shaft 21, a pulley 34 is secured to the shaft 21 between the bearings 22 as by a set screw 35. A belt 36 connects the pulley 34 to a driven pulley 37 which is secured to the end of the shaft of a motor 38. The belt 36 extends to either side of the bearing base 39 which is provided with an extension 40 supporting the induction coil 20 and the motor 38.

In the operation of the invention, the motor 38 is energized to effect rotation of the core 1. The nozzles 18 and 19 are opened to force the plastic resin 17 into the chambers adjacent the ends of the core 1. Due to the rotation of the core, the plastic is driven to the interior of the cylindrical wall 7 by centrifugal force. As more and more plastic resin 17 flows into the chambers, the centrifugal force due to the rotation of the core and wall continuously acts on the resin in a radially outward direction to firmly build up the resin within the chambers adjacent the ends of the core 1. The resin is also compacted into any voids within the ends of the windings 4 and also within the slots of the core.

Simultaneously with the rotation of motor 38 and with the projection of the resin 17 from the nozzles 18 and 19, the windings 3 and the induction coil 20 are energized to generate heat for the curing and setting of the resin 17. The induction coil 20 inductively creates in the cylindrical wall 7 a secondary current which generates heat. The flow of current in the windings 3 generates heat because of the resistance of the windings.

The simultaneous application of the centrifugal force and the heat to the plastic resin 17 results in a tightly compacted plastic mass filling the chambers about the ends of the stator core 1 and the slots of the core. The plastic resin 17 works into the spaces between the conductors of the winding 3 and forms a solid wall between the conductors.

The present invention provides a plastic insulation around the winding which is free of bubbles and voids within the plastic itself as well as adjacent the adjoining surfaces between the plastic and the conductors of the winding 4 and the core 1.

A second means for rotating the core and the surrounding walls is illustrated in Fig. 7 wherein the same elements in Figs. 4 and 7 are given the same number. The completed core 1 and walls 7, 8 and 9 are secured to the shaft 18 by a clamp as in Fig. 4. In place of the motor 38 of Fig. 4, the embodiment of Fig. 7 employs a stationary stator 41 surrounding the core 1 and wall 7 and supported in position by the base extrusion 40. The core 1 and wall 7 act as the rotor of an induction motor and by suitable excitation of the stator the core 1 and wall 7 rotates.

As in the prior embodiment, the plastic resin 17 is inserted into the container by a pair of nozzles 18 and 19. The resin is inserted while the container and core are rotating and while the winding 3 is energized.

In the embodiment of Fig. 7, the shaft may be braked in whole or in part, with a resultant decrease in centrifugal effect on the plastic and increased generation of heat in the container.

To provide a brake for the shaft, the shaft is provided with an axially tapered enlargement 42 surrounded by a complementary tapered annular brake shoe 43. Axial movement is imparted to the brake shoe by a lever 44 having a yoke 45 extending to each side of the shaft 21, with each side of the yoke 45 connected to the brake shoe 43 by a link 46. An adjustment screw 47 passes through the lever 44 and is threaded into the upstanding bearing bracket 48. A coil spring 49 surrounds the set screw between the head of screw 47 and the lever 44 and resiliently holds the brake shoe 43 in engagement with the enlargement 42.

Other than for the above noted differences the embodiments of the invention illustrated in Figs. 4 and 7 are the same. In both embodiments, the thermosetting resin 17 is projected into the chambers adjacent the ends of the core and simultaneously set and centrifugally cast as described above.

The curing and setting time required for the resin 17 can be decreased further by preheating the plastic resin 17, such as by heating the nozzles 18 and 19.

The insulated stator assembly is inserted within a suitable housing, not shown, either with or without the retaining walls 7, 8 and 9.

The invention provides a method of casting plastic insulation about the windings of a dynamoelectric machine wherein the insulation is substantially devoid of bubbles and the like to overcome the problem of hot spots.

Although the envelopes is described as a plastic resin, it is within the scope of the present invention to employ a combination of a plastic resin and a suitable filler such as sand. The filler reduces the amount of resin required and thereby substantially reduces the cost of the envelope.

Various modes of carrying out the invention are contemplated as within the scope of the following claims particularly pointing out and distinctly claiming the subject matter which is regarded as the invention.

I claim:

1. In a method of encasing a dynamoelectric machine winding disposed within a plurality of winding slots on the interior surface of an annular core member, the steps which comprise disposing the winding and core member within a cylindrical container, enveloping the winding by a body of free-flowing thermosetting plastic resin, and rotating the cylindrical container about its own axis while simultaneously energizing the winding to centrifugally cast and cure and set the resin.

2. In a method of encasing in plastic an annular dynamoelectric core carrying a winding on the interior surface, the steps which comprise inserting a plastic resin within a tubular mold surrounding the core and winding, rotating the mold and resin about the axis of the tubular mold at sufficient speed to centrifugally drive the resin about said winding and about the conductors forming said winding, and exciting the winding while rotating the mold and resin to cure and set the resin.

3. The method of providing a fluid-tight encasement for a winding wound on the interior surface of an annular magnetizable core for a dynamoelectric machine, which comprises inserting a thermosetting plastic resin within a metallic tubular mold surrounding the core and winding while simultaneously rotating the mold and the core and the winding about the axis of the tubular mold to centrifugally compact the plastic resin and to force the resin in any spaces between the conductors of the winding, and simultaneously exciting the winding and heating the metallic tubular mold to cure and set the resin.

4. The method of providing a fluid-tight encasement about a winding of a dynamoelectric machine, which comprises forming a winding from an electrical conductor, securing the winding within a plurality of slots on the interior surface of an annular magnetic core, securing to the exterior surface of the core to a cylinder having radially inwardly extending sides, inserting a thermosetting plastic resin within the cylinder about the core and winding, exciting the winding to heat the resin and thereby cure and set the resin, and rotating the core and cylinder about the axis of the cylinder while curing and setting the resin to centrifugally cast the resin in hardened plastic form about the winding and thereby eliminate voids within the plastic and between the plastic and the adjacent cylinder and core.

5. In a method of enclosing a dynamoelectric machine winding which is secured within a plurality of slots on an inner surface of an annular magnetic core, the steps which comprise securing the core and winding within a metallic mold, rotatably mounting the mold to allow free rotation thereof, disposing a stator in spaced relation to the mold, exciting the stator to effect rotation of the mold arising from a motor action between the stator and the mold, inserting an uncured thermosetting resin into the mold during the rotation of the mold to form a solid void-free mass encasing the winding, and energizing the winding to produce heat to cure and set the resin, said resin also being cured and set by the temperature rise of the mold as a result of the motor action.

6. In a method of enclosing a dynamoelectric machine winding according to claim 5 including the step of braking the rotation of the mold to increase the temperature rise of the mold and thereby decrease the curing and setting time.

References Cited in the file of this patent
UNITED STATES PATENTS

| | | |
|---|---|---|
| 2,208,230 | Rubissow | July 16, 1940 |
| 2,351,321 | Compton | June 13, 1944 |
| 2,633,605 | Brucker | Apr. 7, 1953 |
| 2,695,856 | Firth | Nov. 30, 1954 |
| 2,697,855 | Brown | Dec. 28, 1954 |
| 2,749,456 | Luenberger | June 5, 1956 |

OTHER REFERENCES

A. E. Javitz: "Electrical Manufacturing," September 1951, page 109.